US011829741B2

(12) United States Patent
Sipcic et al.

(10) Patent No.: US 11,829,741 B2
(45) Date of Patent: Nov. 28, 2023

(54) INSTANTIATED DEPLOYMENT OF MICROSERVICES

(71) Applicant: International Business Machines Corporation, Armonk, NY (US)

(72) Inventors: Slobodan Sipcic, Bethesda, MD (US); Peeyush Jaiswal, Boca Raton, FL (US); Naeem Ahmed, Troy, MI (US); Priyansh Jaiswal, Boca Raton, FL (US); Niyati Patel, Okemos, MI (US)

(73) Assignee: International Business Machines Corporation, Armonk, NY (US)

( * ) Notice: Subject to any disclaimer, the term of this patent is extended or adjusted under 35 U.S.C. 154(b) by 3 days.

(21) Appl. No.: 17/653,874

(22) Filed: Mar. 8, 2022

(65) Prior Publication Data

US 2023/0289158 A1 Sep. 14, 2023

(51) Int. Cl.
*G06F 9/44* (2018.01)
*H04L 29/08* (2006.01)
*G06F 8/658* (2018.01)
*G06F 9/455* (2018.01)
*G06F 8/60* (2018.01)

(52) U.S. Cl.
CPC ..................................... *G06F 8/60* (2013.01)

(58) Field of Classification Search
CPC ...... G06F 8/60; G06F 8/36; G06F 8/75; G06F 16/24578; G06F 16/2455; G06F 8/71; G06F 11/3692; G06F 8/427; G06F 9/5055; G06F 8/4441; G06F 9/455; G06F 8/65; G06Q 30/04; H04L 67/34
See application file for complete search history.

(56) References Cited

U.S. PATENT DOCUMENTS 9,274,784 B2   3/2016 Wang
9,838,376 B1  12/2017 Lander
(Continued)

FOREIGN PATENT DOCUMENTS

CN   105573751 A   5/2016
CN   106533929 A   3/2017
(Continued)

OTHER PUBLICATIONS

"Service Template", Microservice Architecture, Copyright © 2021, 3 pages, <https://microservices.io/patterns/service-template.html>.
(Continued)

*Primary Examiner* — Thuy Dao
(74) *Attorney, Agent, or Firm* — Stephen R. Yoder

(57) ABSTRACT

A method, computer program product and computer system to generate a codebase for tenant microservices in a distributed computing environment is provided. A processor receives a request from a tenant to deploy a microservice in a distributed computing environment. A processor retrieves a schema associated with the tenant and the microservice to be deployed. A processor retrieves a constructor class associated with the microservice. A processor deploys an instance of the microservice within the distributed computing environment based on the constructor class associated with the microservice. A processor provides a service endpoint within the distributed computing environment managed by the deployed instance of the microservice.

18 Claims, 6 Drawing Sheets

(56) References Cited

U.S. PATENT DOCUMENTS

| | | | |
|---|---|---|---|
| 10,230,571 | B2 | 3/2019 | Rangasamy |
| 10,389,602 | B2* | 8/2019 | Chang ................. H04L 41/5045 |
| 10,447,770 | B2 | 10/2019 | Pacella |
| 10,803,411 | B1 | 10/2020 | Smith |
| 2019/0034460 | A1* | 1/2019 | Eberlein ............... G06F 16/213 |
| 2020/0019388 | A1 | 1/2020 | Jaeger |
| 2020/0065086 | A1 | 2/2020 | Woodmansee |
| 2020/0341754 | A1 | 10/2020 | Kunjuramanpillai |
| 2021/0124576 | A1 | 4/2021 | Gungabeesoon |
| 2021/0132935 | A1 | 5/2021 | Dinh |
| 2021/0165679 | A1 | 6/2021 | Oezmen |

FOREIGN PATENT DOCUMENTS

| | | | |
|---|---|---|---|
| CN | 110224869 | A | 9/2019 |
| CN | 107193546 | B | 5/2021 |
| CN | 113312074 | A | 8/2021 |

OTHER PUBLICATIONS

Mell et al., "The NIST Definition of Cloud Computing", NIST National Institute of Standards and Technology U.S. Department of Commerce, Special Publication 800-145, Sep. 2011, 7 pages.

"Patent Cooperation Treaty PCT Notification of the International Search Report and the Written Opinion of the International Searching Authority, or the Declaration", International application No. PCT/CN2023/080040, International filing date Mar. 7, 2023, dated May 31, 2023, 8 pages.

* cited by examiner

INSTANTIATED DEPLOYMENT OF
MICROSERVICES

BACKGROUND OF THE INVENTION

The present invention relates generally to the field of microservices, and more particularly to deploying instanced microservices using a constructor class.

Microservices are an architectural and organizational approach to software development where software is composed of small independent services that communicate over well-defined application programming interfaces (APIs). Microservices architectures make applications easier to scale and faster to develop, enabling innovation and accelerating time-to-market for new features. A monolithic approach runs all components or processes are as a single service. Whereas, with microservices architecture, applications are built as various independent components that run as a process as a service in a distributed computing environment. Microservices communicate with one another and other programs via APIs. Because microservices are independent in operation and execution, each service can be updated, deployed, and scaled to meet demand for specific functions.

SUMMARY

Embodiments of the present invention provide a method, system, and program product to generate a codebase for tenant microservices in a distributed computing environment is provided. A processor receives a request from a tenant to deploy a microservice in a distributed computing environment. A processor retrieves a schema associated with the tenant and the microservice to be deployed. A processor retrieves a constructor class associated with the microservice. A processor deploys an instance of the microservice within the distributed computing environment based on the constructor class associated with the microservice. A processor provides a service endpoint within the distributed computing environment managed by the deployed instance of the microservice.

DETAILED DESCRIPTION

Figure 1:
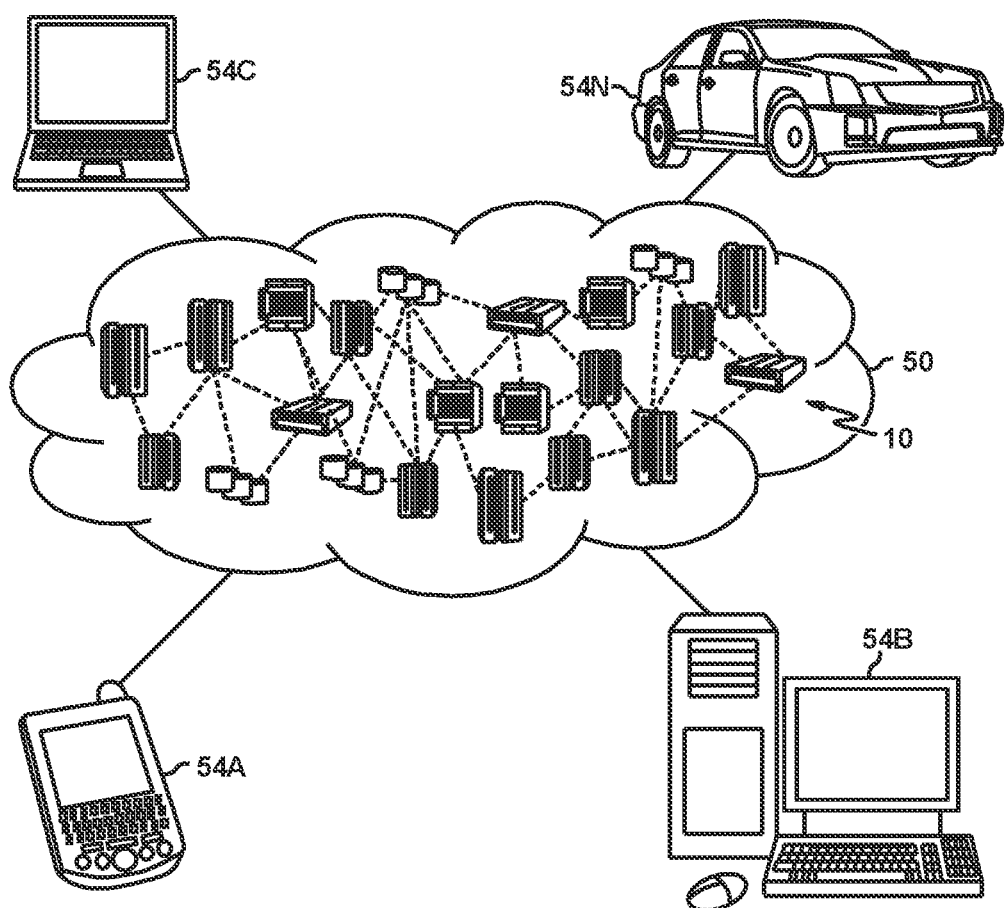
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
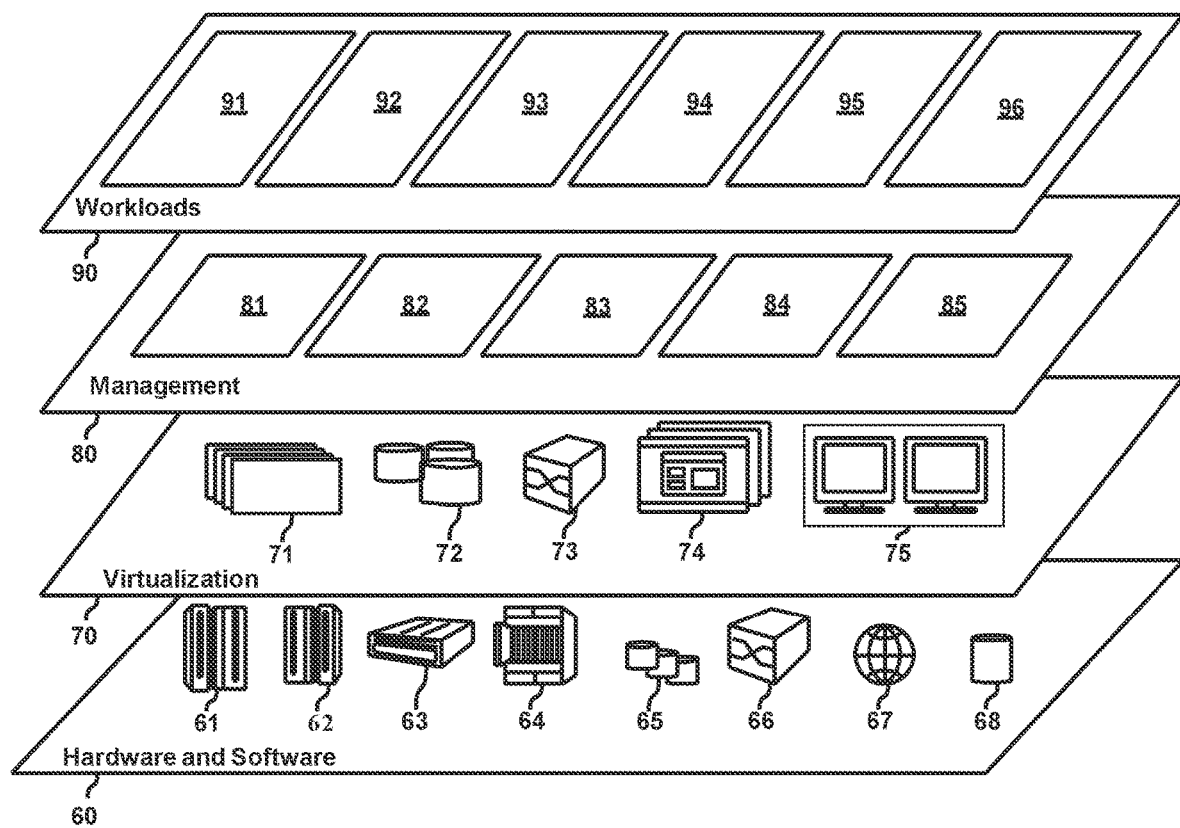
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Metering and Pricing 81 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 82 provides access to the cloud computing environment for consumers and system administrators. Service level management 83 provides cloud computing resource allocation and management such that required service levels are met. Service Level Agreement (SLA) planning and fulfillment 84 provide pre-arrangement for, and procurement of, cloud computing resources for which a future requirement is anticipated in accordance with an SLA. Resource provisioning 85 provides dynamic procurement of computing resources and other resources that are utilized to perform tasks within the cloud computing environment.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and microservices 96. Microservices 96 are workloads that provide various component operations or functions for a larger software package or platform.

Figure 3:
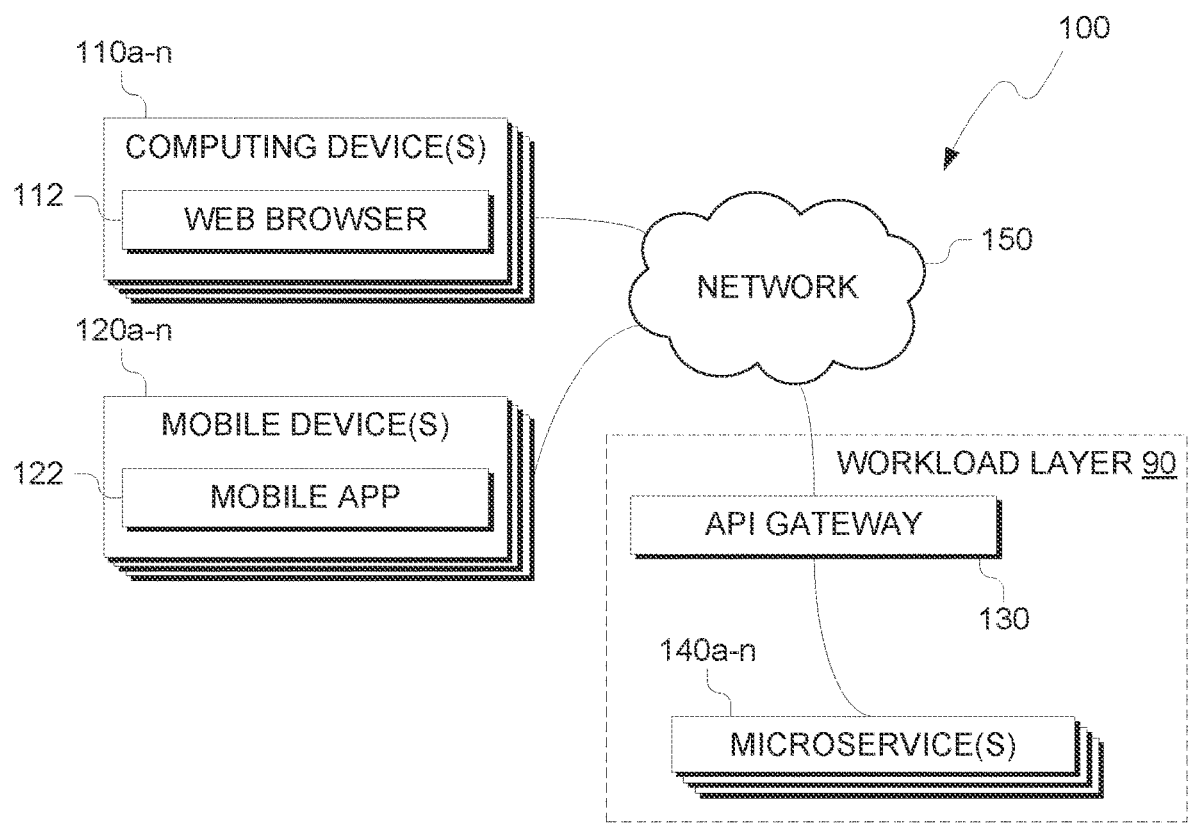
FIG. 3 illustrates a computing environment for deploying microservices via an API gateway.

FIG. 3 is a functional block diagram illustrating computing environment, generally designated 100, in accordance with one embodiment of the present invention. Computing environment 100 includes computing device(s) 110a-n, mobile devices 120a-n, Application Programming Interface (API) gateway 130, microservices 140a-n and network 150. Computing device(s) 110a-n include a respective web browser 112. Mobile device(s) 120a-n include a respective mobile app 122. API Gateway 130 and Microservice(s) 140a-n are workloads in workload layer 90 of cloud computing environment 50.

In various embodiments of the present invention, computing device(s) 110a-n and mobile devices 120a-n are each computing devices that can be a standalone device, a server, a laptop computer, a tablet computer, a netbook computer, a personal computer (PC), or a desktop computer. In another embodiment, any of computing device(s) 110a-n or mobile devices 120a-n represent a computing system utilizing clustered computers and components to act as a single pool of seamless resources. In general, computing device(s) 110a-n or mobile devices 120a-n can be any computing device or a combination of devices with access to API gateway 130 or microservice(s) 140a-n and is capable of executing web browser 112 and mobile app 122. Computing device(s) 110a-n or mobile devices 120a-n may include internal and external hardware components, as depicted and described in further detail with respect to FIG. 6.

In this exemplary embodiment, web browser 112 are stored on a respective computing device 110a-n and mobile app 122 is stored on a respective mobile device 120a-n. However, in other embodiments, web browser 112 and mobile app 122 may be stored externally and accessed through a communication network, such as network 150. Network 150 can be, for example, a local area network (LAN), a wide area network (WAN) such as the Internet, or a combination of the two, and may include wired, wireless, fiber optic or any other connection known in the art. In general, network 150 can be any combination of connections and protocols that will support communications between computing device(s) 110a-n, mobile devices 120a-n, and cloud computing environment 50, in accordance with a desired embodiment of the present invention.

In various embodiments, API Gateway 130 routes and directs various requests from clients, such as user of computing devices 110a-n and mobile devices 120a-n, to access one or more microservices 140a-n. Microservices are independent and loosely coupled components of a software product or platform that have been separated from a more traditional monolithic approach. A monolithic architecture to software deployment attempts to bundle or unite as many components to a single system, whereas in microservices, the components are developed to run independent of one another both in a time-slice manner and physical location. For example, a monolithic approach to designing a payment system would typically have a central server with various functions being performed all within that server. A microservices approach would separate those various functions of the server into separate processes and supporting code, such as a user payment function and a billing function in a payment system. Microservices offer ease of maintaining, testing and development as each microservice, when properly designed, can be updated independently from other microservices, where a monolithic system would require the entire system to be taken offline and updated.

However, by separating a monolithic system into microservices introduces many issues, namely cross-cutting concerns. In software development, cross-cutting concerns are issues that arise in software development that affect other aspects of the system or platform. Example cross-cutting concerns with deploying microservices include concerns such as externalized configuration, logging, health checks, metrics, service registration, discovery, circuit breakers and distributed tracing. In a microservice environment, since each function of the monolithic approach is separated, developers need to ensure that changes to a microservice causes any issues (i.e., concerns) to any other related microservice or system. When these issues effect other microservice, the concern "crosses" over and "cuts" the operation of the other microservices.

Therefore, microservices that offer flexibility and modularity also increase development complexity. Prior solutions to developing and deploying microservices typically provide developers with a template for a certain microservice. The developers would then modify the template and deploy the microservice onto a cloud computing platform. These prior solutions require development time and effort, as well permitting developers to introduce cross-cutting concerns by way of errors and other improper coding techniques. Embodiments of the present invention recognize that by creating a development pipeline to create and deploy microservices workloads in a cloud computing platform, a microservice class object can be created and provided to developers. The microservice class object can be used to create a containerized instance of any microservice, which is then exposed via an API to developers, tenants and other users. Embodiments of the present invention recognize that by instantiating microservice via the disclosed microservice class object, developers can quickly deploy, develop and update microservice while also standardizing any implementations that cause and cross-cutting concerns.

FIG. 3 depicts a computing environment 100 with deployed microservices 140a-n for a tenant. A tenant is an organization which utilize cloud computing environment 50 to deploy microservices 140a-n as workloads in workload layer 90. For example, the tenant is utilizing cloud computing environment 50 to provided electronic retailer functions for both a website (accessed via web browser 112) and mobile app 122. Instead of having two monolithic servers for both the website and mobile app 122, microservices 140a-n provide support for both. Example microservices may include an account management service, a checkout service and a payment service.

API gateway 130 provides various endpoints for users to connect via network 150 to cloud computing environment 50 or be routed to cloud computing environment 50. When users visit the website via web browser, API Gateway 130 communicates to web browser 112 to perform any microservice requested during the visit. For example, when a user makes a change to there home address, then API Gateway 130 establishes a connection with the user, or an intermediary such as the tenant's operated retail website, to perform the necessary service. In the example, an account management microservice is evoked to perform the necessary operation to update a database that maintains the customer's address.

As depicted in FIG. 3, computing environment 100 includes computing device(s) 110a-n and mobile devices 120a-n to highlight the flexibility of microservices 140a-n, inasmuch that microservices 140a-n can be designed to handle functions and features across many platforms. One of ordinary skill in the art will appreciate that any user or device may access API gateway 130 to utilize microservice 140a-n without deviating from the invention.

Figure 4:
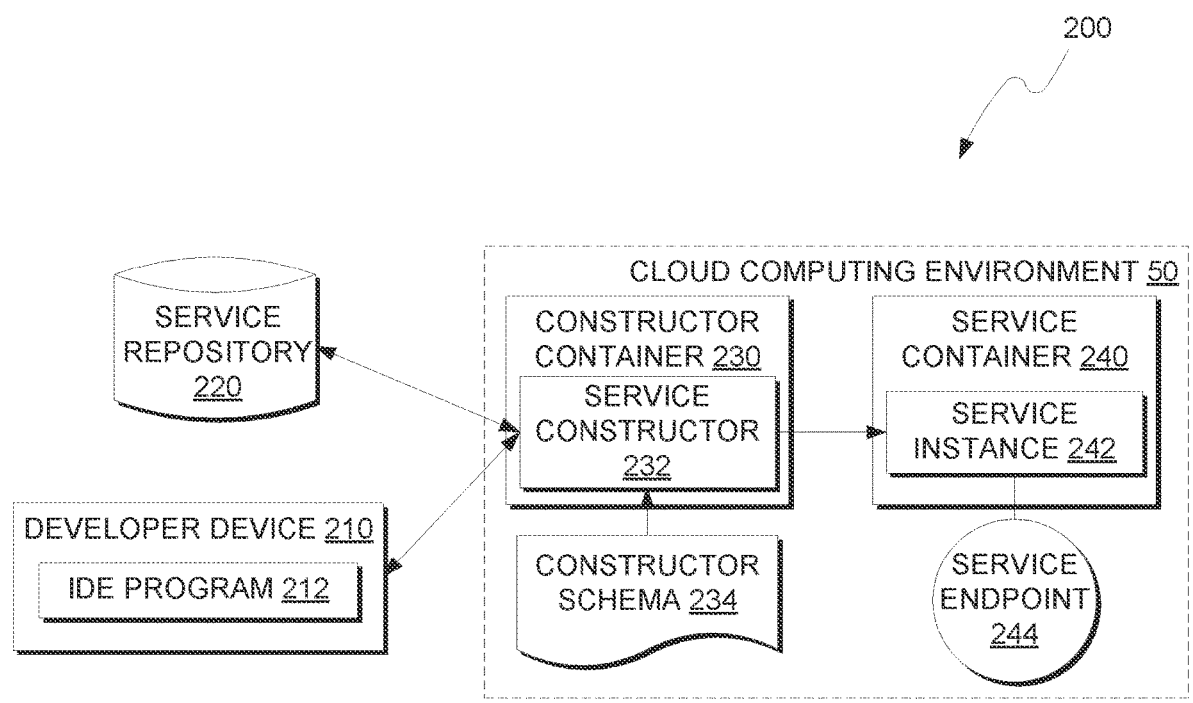
FIG. 4 illustrates a development environment for deploying a microservice.

FIG. 4 illustrates a development environment 200 for deploying a microservice. Service repository 220 includes various microservice class objects associated with a variety of microservices. Each microservice class object includes a constructor routine that is accessed via an API by a user of developer device 210 via IDE program 212. When populating the microservice class objects in service repository 220, a designer retrieves or creates various design patterns for the types of microservices 140a-n to be supported by cloud computing environment 50. Design Patterns are the processes and steps to perform certain tasks. For example, a design pattern indicates the steps to perform an asynchronous microservice with retires. As another example, a "decorator" design pattern outlines a generic process for users to add or change properties of an object without modifying the parent class and any objects of the same class.

Based on the design patterns needed to perform certain tasks, a microservice class object is created and stored in service repository 220 to instantiate microservices for tenants of cloud computing environment 50. In various embodiments, the microservice class objects in service repository 220 include the list of design patterns required to perform the associated microservice. For example, the microservice class objects include a YAML (yet another markup language) which lists the various design patterns required in a sequenced list of order to load, with cross-cutting concerns being mapped to other design patterns in the list. If any cross-cutting concerns impact other design patterns, then the design patterns comprising the microservices may be restricted or otherwise changed to limit the impact of any cross-cutting concerns. For example, a "sidecar proxy" design pattern may be created if resource usage of a design pattern exceeds a threshold. A "sidecar proxy" design pattern is a deployed as dependent container to service container 240 and are instanced portions of code that replicate certain features or portions of code. Since the "sidecar proxy" design pattern is a deployed as a dependent container to service container 240, and domain logic and tenant specific rules can be carried over without requiring the tenant to redesign the overall pattern for the microservice. Furthermore, since the containers are dependent on one another, cloud computing environment 50 can deploy and orchestrate both containers in a pod. A pod is a collection of containers that typically share resources, such as storage. While collated in a pod, cloud computing environment 50 can better orchestrate both the service container 240 and any sidecar containers, minimizing cross-cutting concerns. One of ordinary skill in the art will appreciate that any cross-cutting concern and countermeasure may be deployed with service container 240 without deviating from the invention.

In one example, a tenant would like to deploy a payment processing microservice in cloud computing environment 50. In this example, the tenant identifies a "Payment Processing" constructor container 230 template is already provided in service repository 220. The tenant selects the template and provides any domain logic needed to orchestrate the microservice on behalf of tenant. Domain logic are rules and other indica used to direct the deployed microservice to other connected services and devices that the tenant utilizes. For example, in the "Payment Processing" template a portion of the template performs a "Payment Processed" task once the payment has been fulfilled. The "Payment Processed" task includes a portion for tenant to provide domain logic so that the tenant can instruct an order fulfillment server of the successful payment, so that the entity of the tenant can fulfill shipping orders of product once the payment is successful. In this example, the tenant provides a YAML file with domain logic to communicate with the order fulfillment server, such that the microservice once instantiated can be tailored to the tenant's systems that are either external to cloud computing environment 50 or other microservices provided by cloud computing environment 50.

In another example, service repository 220 does not have a specific microservice available for a specific task a tenant would like to deploy in cloud computing environment 50. As previously discussed, service repository 220 includes various design patterns to handle common tasks or operations handled by microservices. For example, a design pattern defines a flowchart or diagram that illustrates the various tasks and order of tasks needed to be performed to provide an "asynchronous microservice with retires". Asynchronous microservices can operated and orchestrated independently within cloud computing environment 50. As such, the design pattern includes logical flow to account for the asynchronous nature of the microservice. The "Retires" portion indicates that the microservice will "retry" or repeat certain processes until a "Responder" entity responds. For example, a first microservice is asynchronously executing within cloud computing environment 50 with a second microservice. The first microservice needs information from the second microservice, or responder microservice. The tenant can place a responder identifier for the other microservice as domain logic in the design pattern. The various design patterns can be assembled to form an overall flow of a microservice.

Returning to the previous example, the "Payment Processing" constructor container 230 is generated based on the assembled patterns of the microservice. For example, various design patterns for common microservice tasks are designed and interconnected to indicate an overall design flow for a microservice, such as the example payment processing microservice. The overall design flow of the connected design patterns forms a graphical representation of the service instance 242 when deployed via constructor container 230. One of ordinary skill in the art will appreciate that any representation of the flow or design logic of the design patterns may be used without deviating from the invention.

In various embodiment, design patterns in service repository 220 are arranged in a graphical manner by a tenant to provide a microservice. Once the various design patterns are assembled to create a graph or flowchart for a to-be deployed microservice, the underlying codebase for the constructor container 230 is generated. The flow and interconnections of the design patterns define the overall structure and procedure of the microservice while tenant provided domain logic populates the specific entities utilized by the microservice. For example, the "asynchronous microservice with retires" design pattern includes logic to request information from a "Responder". The design pattern includes the logical flow of asking and waiting for a response, and how retries are performed (e.g., the number of retire attempts, delay between retries, etc.). The tenant provided domain logic defines where the "Responder" is located, such as another microservice identifier or a device external to cloud computing environment 50. In various embodiments, machine vision is applied to the design pattern(s) to determine the interconnections and flow of the design pattern, identifying flow indicators and nodes of the graph. Based on this arrangement, the overall flow of the underlying codebase for the constructor container 230 is generated, with domain logic and other placeholders being inserted when provided by a tenant.

In various embodiments, the microservice class objects stored in service repository 220 also includes constructor container 230 which allows developers to instantiate an instance of the microservice within cloud computing environment 50 via service constructor 232. Based on the specific constructor schema 234 for the developer/tenant of cloud computing environment 50, service container 240 is deployed in cloud computing environment 50 via service constructor 232, which includes a service instance 242 of the microservice. Additionally, service endpoint 244 is virtualized within cloud computing environment 50 such that users of the tenant's platform may access the microservice.

Figure 5:
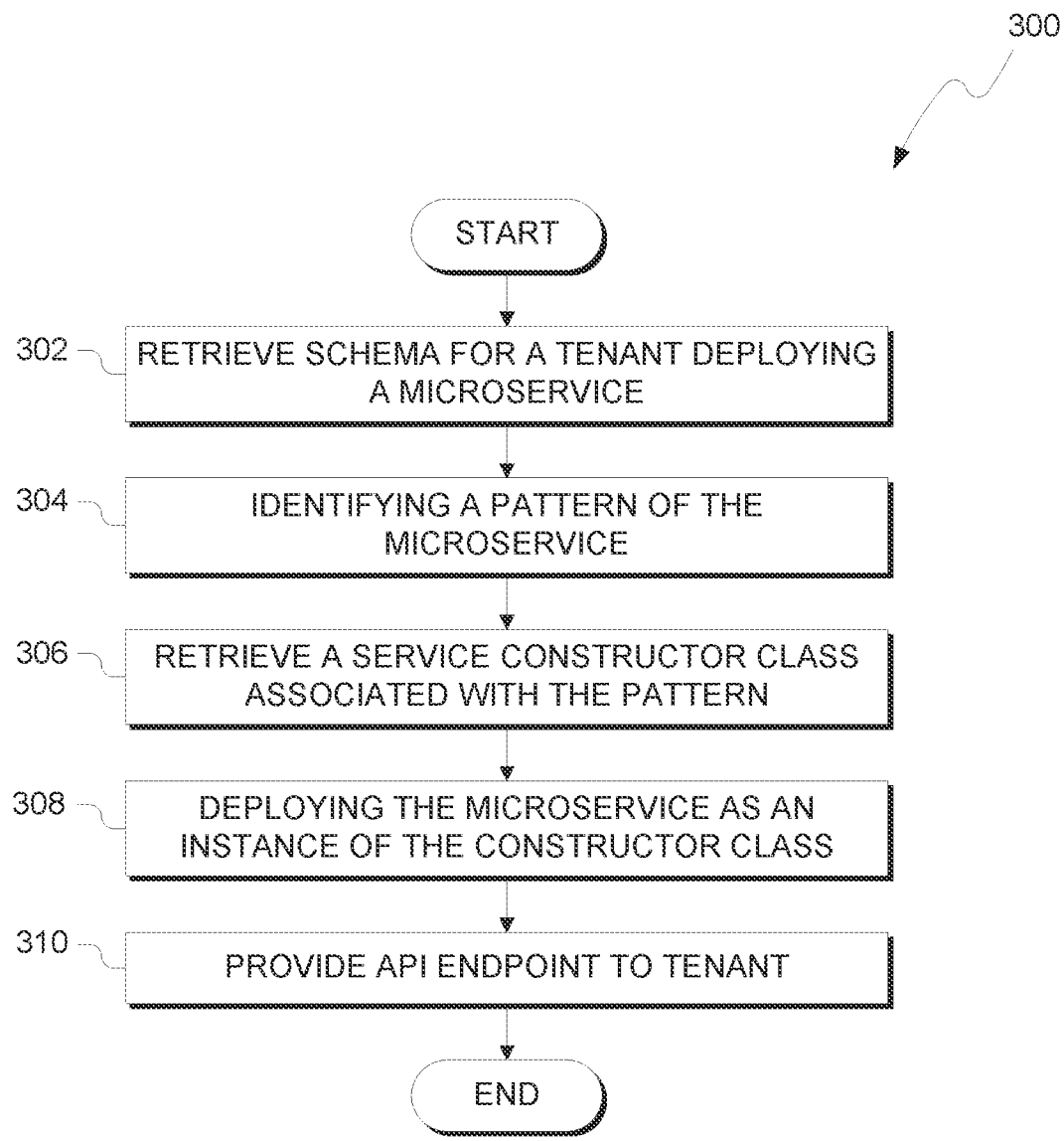
FIG. 5 illustrates operational processes of instantiating a microservice workload within a computing cloud environment.

FIG. 5 illustrates operational processes, generally designated 300, of instantiating a microservice workload within computing cloud environment 50. In process 302, management layer 80 receives indication from a tenant to deploy a microservice to computing cloud environment 50. Management layer 80 retrieves schema for the tenant deploying the microservice. For example, management layer 80 retrieves the Tenant ID for the tenant deploying the microservice, a Correlation ID for the request, and any other schema related to deploying a microservice, such as a target version of the microservice and any APIs requested.

In process 304, management layer 80 identifies the design patterns of the microservice to be deployed. In some embodiments, management layer 80 retrieves a template for the microservice comprising design patterns and deploys the template as an instantiated constructor class 230 as service instance 242. In other embodiments, management layer 80 constructs constructor class 230 based on the flow and logic of one or more component design patterns. In such embodiments, a tenant designs an overall flow of the microservice using graphical design patterns pertaining to common microservice tasks as provided in service repository 220. Once the tenant arranges the graphical design patterns, management layer 80 generates the underlying codebase for constructor container 230. Based on a machine vision inspection of the tenant-arranged design patterns, management layer 80 generates code to replicate the flow of the tenant-arranged design patterns and inserts any tenant-provided domain logic to connect the microservice to other services, databases or devices that may be a part of, or external to, computing cloud environment 50.

In process 306, management layer 80 retrieves the constructor class associated with the to be deployed microservice based on the component design patterns of the microservice. In some scenarios, management layer 80 generates the constructor class based on the component design patterns of the microservice. In process 308, management layer 80 deploys an instance of the microservice within computing cloud environment 50. In various embodiments, management layer 80 clones the constructor class as an independent service instance 242. Additionally, management layer 80 deploys any additional resources and data structures to address any cross-cutting concerns indicated by the component design patterns of the microservice. In process 310, management layer 80 provide an API endpoint, such as service endpoint 244, to provide software or platform support to various users via API Gateway 130. In some instances, a microservice may be initiated for each user where service endpoint 244 is replicated for each user task. In other instances, service endpoint 244 may serve multiple users and may be deployed when a certain number of connections to service endpoint 244 exceeds a threshold value.

Figure 6:
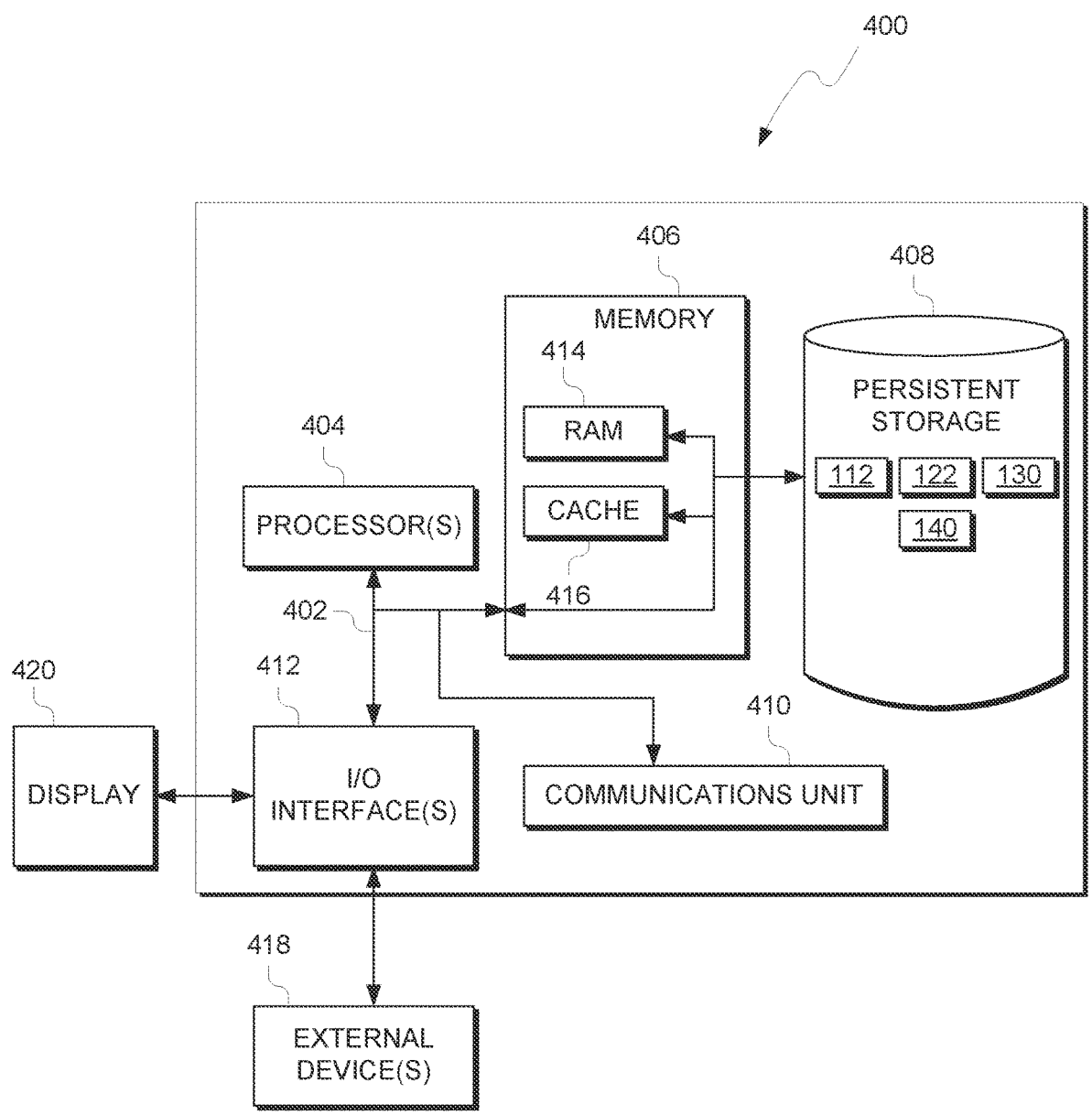
FIG. 6 depicts a block diagram of components of the computing device executing a personal data maintainer workload, in accordance with an exemplary embodiment of the present invention.

FIG. 6 depicts a block diagram, 400, of components of computing device(s) 110a-n and mobile devices 120a-n, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computing device(s) 110a-n or mobile devices 120a-n includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Web browser 112 and mobile app 122, API Gateway 130 and Microservice(s) 140a-n are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 150. In these examples, communications unit 410 includes one or more network interface cards. Communications unit 410 may provide communications through the use of either or both physical and wireless communications links. Web browser 112 and mobile app 122, API Gateway 130 and Microservice(s) 140a-n may be downloaded to persistent storage 408 through communications unit 410.

I/O interface(s) 412 allows for input and output of data with other devices that may be connected to computing device 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., web browser 112 and mobile app 122, API Gateway 130 and Microservice(s) 140a-n, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method comprising:
receiving, by one or more processors, a request from a tenant to deploy a microservice in a distributed computing environment;
retrieving, by the one or more processors, a schema associated with the tenant and the microservice to be deployed;
retrieving, by the one or more processors, a constructor class associated with the microservice;
deploying, by the one or more processors, an instance of the microservice within the distributed computing environment based on the constructor class associated with the microservice;
providing, by the one or more processors, a service endpoint within the distributed computing environment managed by the deployed instance of the microservice;
monitoring, by the one or more processors, the instance of the microservice within the distributed computing environment; and
in response to the instance of the microservice causing a cross-cutting concern with another microservice, adjusting, by the one or more processors, the constructor class associated with the microservice, wherein the adjustment limits an impact of the cross-cutting concern within the distributed computing environment.

2. The method of claim 1, the method further comprising:
receiving, by one or more processors, an arrangement of design patterns from the tenant, wherein the design patterns represent common microservices.

3. The method of claim 2, the method further comprising:
generating, by the one or more processors, an underlying codebase for the constructor class based on the received arrangement of design patterns from the tenant.

4. The method of claim 3, the method further comprising:
receiving, by the one or more processors, one or more domain logic statements from the tenant.

5. The method of claim 4, wherein the underlying codebase of the microservice is populated with the one or more domain logic statements.

6. The method of claim 1, wherein adjusting the constructor class includes separating a portion of the instance of the microservice into another container within a same pod executing within the distributed computing environment.

7. A computer program product comprising:
one or more computer-readable storage media and program instructions stored on the one or more computer-readable storage media, the program instructions comprising:
program instructions to receive a request from a tenant to deploy a microservice in a distributed computing environment;
program instructions to retrieve a schema associated with the tenant and the microservice to be deployed;
program instructions to retrieve a constructor class associated with the microservice;
program instructions to deploy an instance of the microservice within the distributed computing environment based on the constructor class associated with the microservice;
program instructions to provide a service endpoint within the distributed computing environment managed by the deployed instance of the microservice;
program instructions to monitor the instance of the microservice within the distributed computing environment; and
program instructions, in response to the instance of the microservice causing a cross-cutting concern with another microservice, to adjust the constructor class associated with the microservice, wherein the adjustment limits an impact of the cross-cutting concern within the distributed computing environment.

8. The computer program product of claim 7, the program instructions further comprising:
receiving, by one or more processors, an arrangement of design patterns from the tenant, wherein the design patterns represent common microservices.

9. The computer program product of claim 8, the program instructions further comprising:
program instructions to generate an underlying codebase for the constructor class based on the received arrangement of design patterns from the tenant.

10. The computer program product of claim 9, the program instructions further comprising:
program instructions to receive one or more domain logic statements from the tenant.

11. The computer program product of claim 10, wherein the underlying codebase of the microservice is populated with the one or more domain logic statements.

12. The computer program product of claim 7, wherein adjusting the constructor class includes separating a portion of the instance of the microservice into another container within a same pod executing within the distributed computing environment.

13. A computer system comprising:
one or more computer processors;
one or more computer readable storage media; and
program instructions stored on the computer readable storage media for execution by at least one of the one or more processors, the program instructions comprising:
program instructions to receive a request from a tenant to deploy a microservice in a distributed computing environment;
program instructions to retrieve a schema associated with the tenant and the microservice to be deployed;
program instructions to retrieve a constructor class associated with the microservice;
program instructions to deploy an instance of the microservice within the distributed computing environment based on the constructor class associated with the microservice;
program instructions to provide a service endpoint within the distributed computing environment managed by the deployed instance of the microservice;
program instructions to monitor the instance of the microservice within the distributed computing environment; and
program instructions, in response to the instance of the microservice causing a cross-cutting concern with another microservice, to adjust the constructor class associated with the microservice, wherein the adjustment limits an impact of the cross-cutting concern within the distributed computing environment.

14. The computer system of claim 13, the program instructions further comprising:
receiving, by one or more processors, an arrangement of design patterns from the tenant, wherein the design patterns represent common microservices.

15. The computer system of claim 14, the program instructions further comprising:
program instructions to generate an underlying codebase for the constructor class based on the received arrangement of design patterns from the tenant.

16. The computer system of claim 15, the program instructions further comprising:
program instructions to receive one or more domain logic statements from the tenant.

17. The computer system of claim 16, wherein the underlying codebase of the microservice is populated with the one or more domain logic statements.

18. The computer system of claim 13, wherein adjusting the constructor class includes separating a portion of the instance of the microservice into another container within a same pod executing within the distributed computing environment.

* * * * *